March 14, 1939.  W. A. HOCKETT  2,150,833
MOTOR WHEEL UNIT
Filed Nov. 30, 1937  3 Sheets-Sheet 1

Inventor
W. A. Hockett
By Clarence A. O'Brien
Hyman Berman
Attorneys

March 14, 1939.  W. A. HOCKETT  2,150,833
MOTOR WHEEL UNIT
Filed Nov. 30, 1937   3 Sheets-Sheet 2
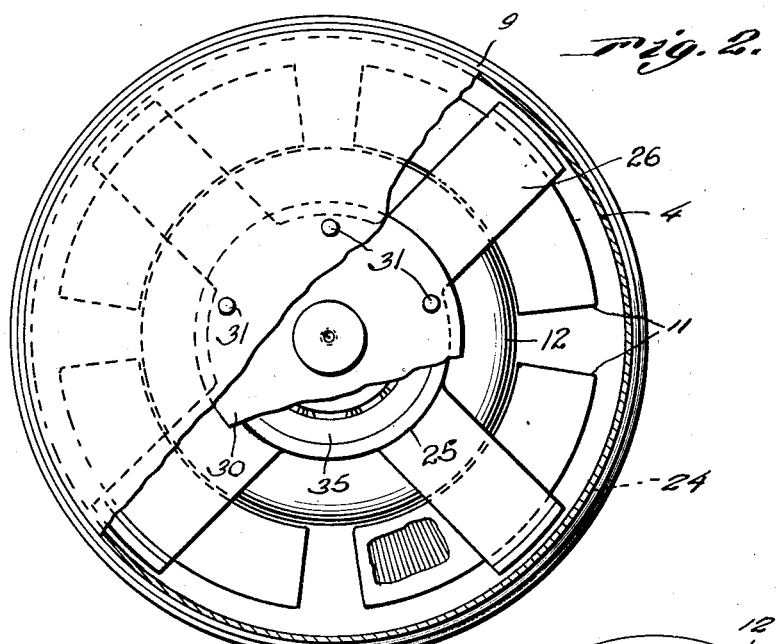
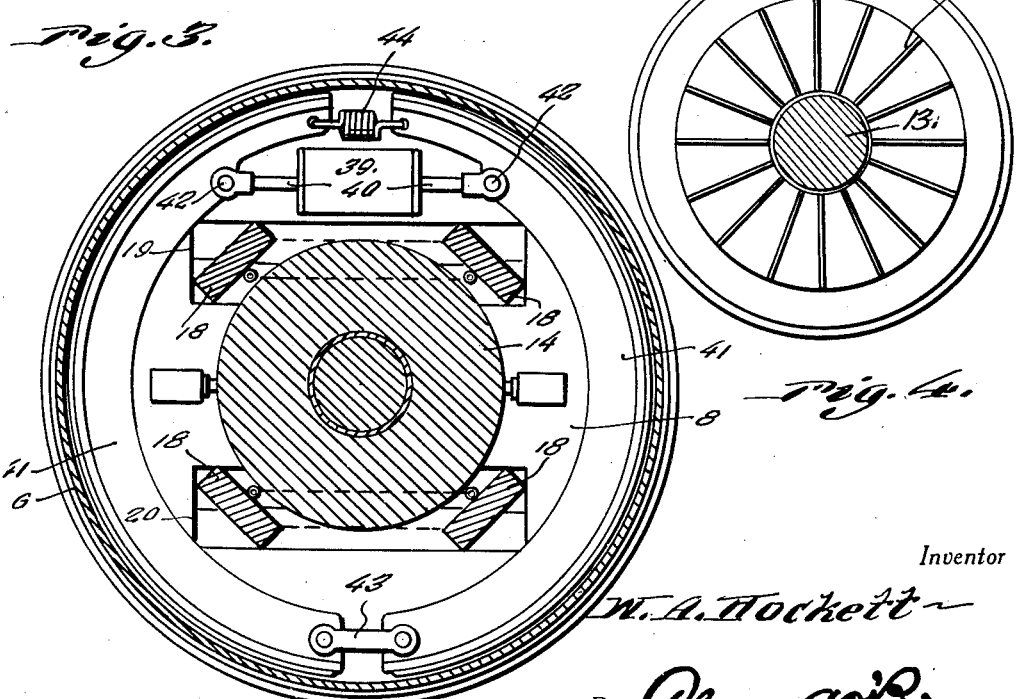
Inventor
W. A. Hockett
By Clarence A. O'Brien
Hyman Berman
Attorneys March 14, 1939.　　　W. A. HOCKETT　　　2,150,833
MOTOR WHEEL UNIT
Filed Nov. 30, 1937　　　3 Sheets-Sheet 3
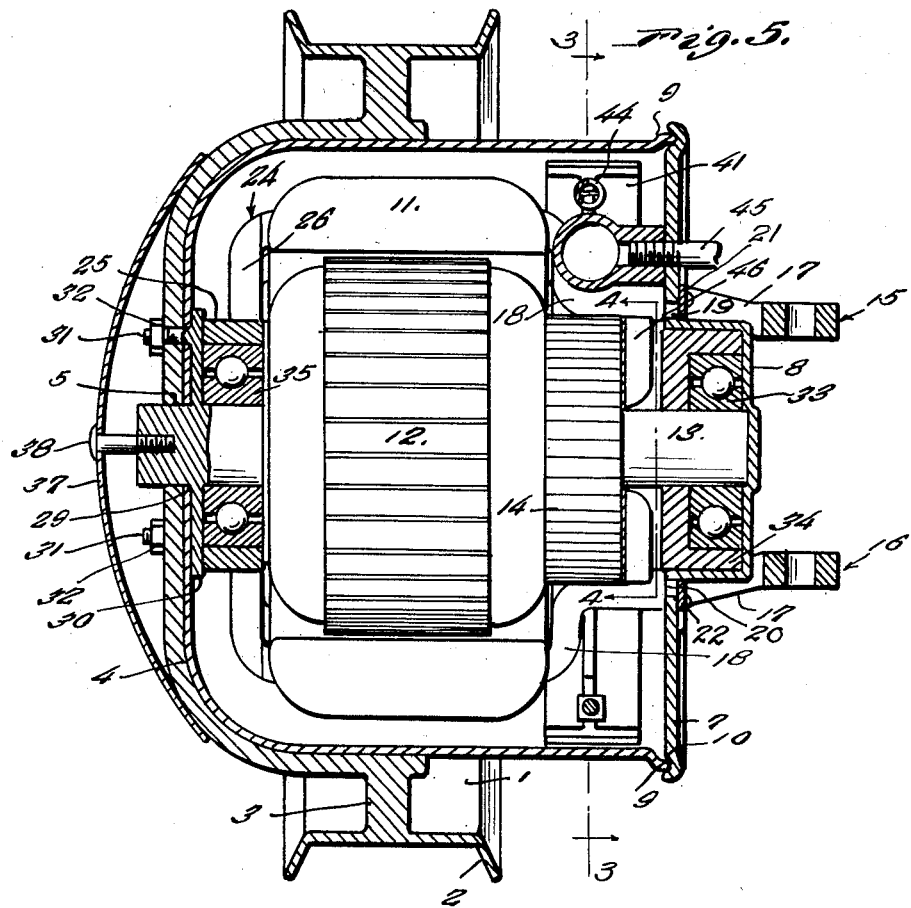
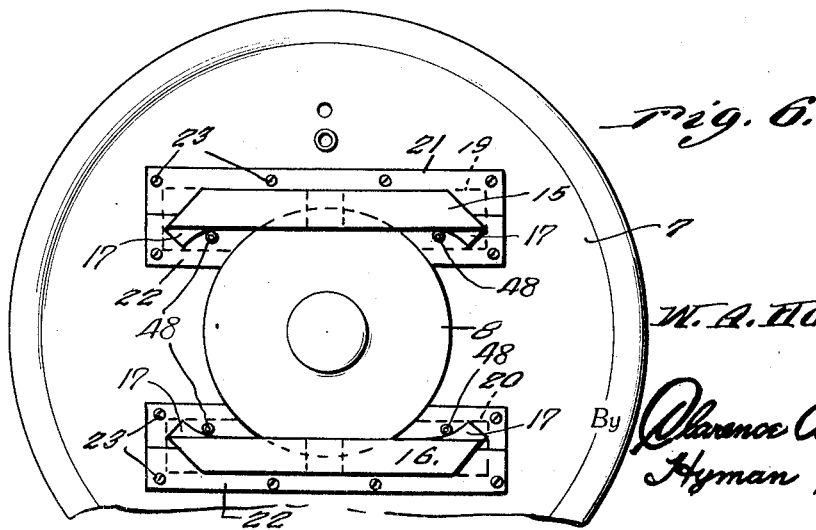
Inventor
W. A. Hockett
By Clarence A. O'Brien
Hyman Berman
Attorneys Patented Mar. 14, 1939

2,150,833

UNITED STATES PATENT OFFICE 2,150,833

MOTOR WHEEL UNIT

Wayne A. Hockett, Waseca, Minn.

Application November 30, 1937, Serial No. 177,306

3 Claims. (Cl. 172—287)

My invention relates to improvements in motor driven wheels for vehicles, particularly automobiles, although as will hereinafter appear the invention is adapted for general application to all types of vehicles.

The primary object of my invention is to provide a compact motor driven wheel and braking unit which, as compared to present day devices of this character, is simplified as regards construction and relation of parts, more highly efficient in operation, and in which all operating parts are enclosed to protect the same from dust and water and adequately cooled against overheating.

Other objects are to provide a unit of the character and for the purpose above set forth which may be readily coupled to the usual knee-action equipment of automobiles, is strong and durable, economical to manufacture, and in which friction between the driving and driven parts is reduced to a minimum.

To the accomplishment of the above and subordinate objects, presently appearing, a preferred embodiment of my invention has been illustrated in the accompanying drawings, set forth in detail in the succeeding description, and defined in the claims appended hereto.

In said drawings:—

Figure 1:
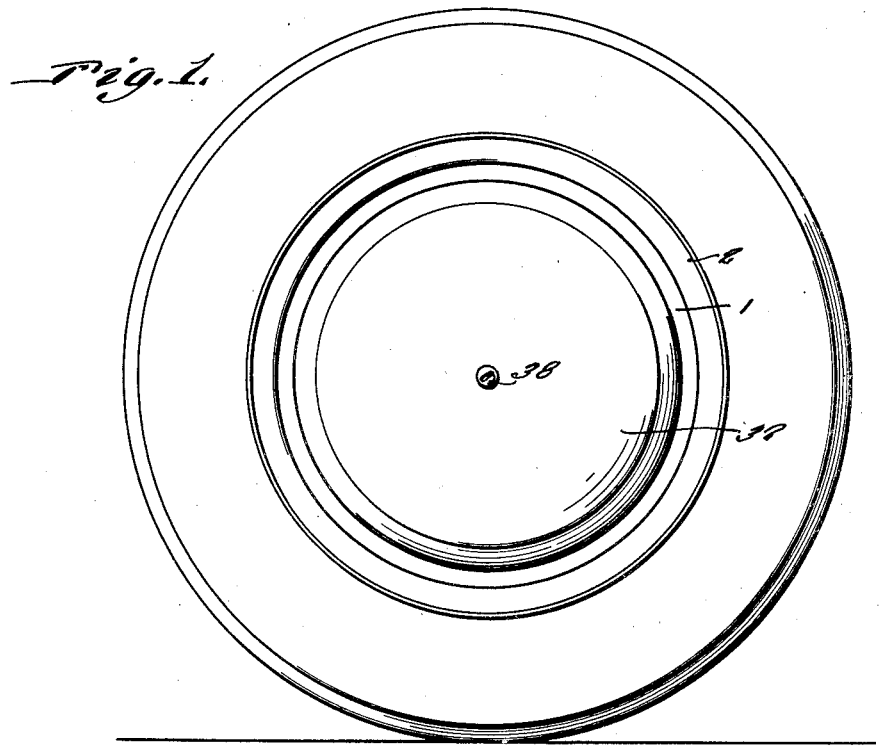
Figure 7:
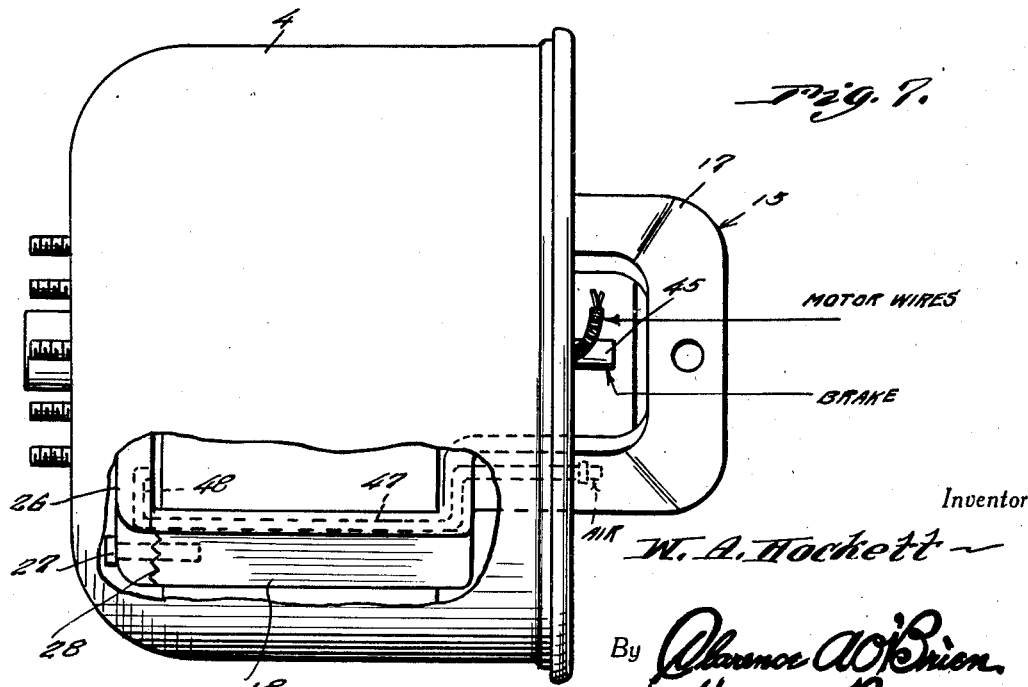

Figure 1 is a view in front elevation of my improved motor driven wheel,

Figure 2 is a similar view, drawn to an enlarged scale, with the wheel removed and looking at the front end of the motor casing, parts being broken away and shown in section to illustrate the manner in which the motor stator is supported by the yoke arms, Figure 3 is a view in vertical transverse section taken on the line 3—3 of Figure 5 looking in the direction indicated by the arrows, Figure 4 is a detailed view in transverse section taken on the line 4—4 of Figure 5 looking in the direction indicated by the arrows and showing the fan and part of the motor armature in rear elevation, Figure 5 is a vertical transverse section taken on the line 5—5 of Figure 1 looking in the direction indicated by the arrows, Figure 6 is a view in rear elevation with the wheel removed, and Figure 7 is a view in elevation with a part broken away and with the wheel portion of the structure removed.

Referring to the drawings by numerals, in the illustrated embodiment thereof my invention comprises a wheel 1 embodying the usual flanged automobile wheel rim 2 for mounting a pneumatic tire, not shown, a central web 3, and a domed shaped hub-like housing 4 extending forwardly from the web 3 and having an axial bore 5 therein for a purpose presently seen. Fitting at its front end into said housing 4 is a similarly shaped cylindrical shell 6 forming a combined motor casing and brake drum closed at its front end, with the exception presently noted, and extending rearwardly out of said housing 4. The rear end of the shell 6 is closed by a circular cap plate 7 having an axial circular hub part 8 extending rearwardly therefrom for a purpose to be explained. The rear edge of the shell 6 is flared outwardly, as at 9, and fits into a groove 10 in the plate 7 to form a seal between the parts. The shell 6 is fixed to the housing 4 to rotate therewith and the cap plate is fixed relative to said shell all by means presently pointed out. The motor comprises the stator, or field part, 11, the rotor or armature 12, the armature shaft 13 and the commutator ring 14 at the rear of the armature 12 all mounted in said shell slightly forwardly thereof as follows: The stator 11 is supported concentrically of the shell 6 by a pair of upper and lower bar-like yoke members 15 and 16 horizontally disposed and each comprising a rear U-shaped end 17 extending beyond the rear of the shell 6 and into the same through the cap plate 7, and a pair of laterally offset forwardly extending arms 18 spanning the stator 11, said arms 18 spanning the stator at 45° point and fitting tightly against the outer and rear faces of the same. The yoke members 15 and 16 extend through the cap plate 7 by way of upper and lower horizontal rectangular slots 19 and 20, said yoke members fitting into the ends of said slots to fixedly support the cap plate 7 thereon. Preferably, as shown in Figure 3, the arms 18 of the yokes 15 and 16 are obliquely disposed in the ends of the slots 19 and 20 at an angle of 45° to fit against the edges of said slots. The slots 19 and 20 are each closed by a pair of upper and lower shutter plates 21 and 22 fitting around the related yoke member 15 or 16, as the case may be, and secured to the rear face of the cap plate 7 in edge to edge relation by bolts 23.

The front ends of the arms 18 are spanned, in front of the stator 11, by a spider member 24 interposed between the stator and the front of the shell 6 and comprising a hub 25 disposed axially of the armature shaft 13 and radial arms 26 bolted to the front ends of the arms 18 as at 27. The radial arms 26 and arms 18 are interlocked by means of teeth formed thereon as indicated at 28.

The rotor 12 is supported as follows: The front end of the armature shaft 16 extends through an aperture 29 in the front wall of the shell 6 and through the beforementioned bore 5 of the housing 4 and is provided with a lateral circular flange 30 having studs 31 extending therefrom through the shell 6 and housing 4 with nuts 32 threaded thereon. Thus, as will be seen, the shell 6 and housing 4 are fixed to the armature shaft whereby the wheel 1 and the shell 6 are rotated by said shaft. The rear end of the armature shaft 13 is rotatably mounted in the cap plate 7 by means of a ball bearing assembly 33 secured in the hub part 8 of said plate 7 by a dished annulus 34 fixed in said hub part 8 in any suitable manner. The front side of the stator 11 is supported on the front end of the armature shaft 13 by means of a ball bearing assembly 35 mounted in the hub 25 of the spider member 24. The rear ends 17 of the yoke members 15 and 16 are bored, as at 36, in vertical alignment for pivotal mounting on the usual spindle, not shown, of an automobile front axle in a manner which will be clear. A concave dust cap 37 is secured to the front of the housing 4 over the front end of the armature shaft 13 and the studs 31 and by means of a screw 38 passing therethrough and into said shaft.

Extending from the cap plate 8 in the rear end of the shell 6, in the vertical center of the latter, is a horizontally disposed brake cylinder 39. The cylinder 39 has a pair of brake operating piston rods 40 extending from opposite ends thereof. A pair of opposed, substantially semi-circular, brake shoes 41 are pivotally mounted at their upper ends, as at 42, on the piston rods 40 for movement thereby into and out of engagement with the inner walls of the shell 6 at the rear end thereof. The lower ends of the brake shoes 41 are pivotally connected together by a link 43 and the upper ends by a tension spring 44 for relative operation in a manner which will be understood. A pipe line 45 leading from a suitable source of fluid supply, under pressure and control, extends through the cap plate 8 into the cylinder 39.

A particular feature of my invention is a cooling system comprising a fan 46 suitably secured to the rear face of the commutator ring 14 and air ducts 47 and 48 in the arms 18 of yokes 15 and 16 and the arms 26 of the spider member 24 respectively. The fan 46 is of the blower type and faces of course rearwardly. The air ducts 47 extend along the under faces of the arms 18 and open at the front of the arms into extension ducts 48 formed in the ends of the spider arms 26 and opening onto the front of the armature 12. The ducts 47 open at the rear of the yoke arms 18 into airlines, as at 48, extending through the cap plate and into said ducts 47. The numeral 49 designates the usual lead to the motor and 50 the commutator brushes which are secured to the cap plate 7 all of which need merely be mentioned in passing.

It will now be seen that the yoke members 15 and 16 together with the spider member 14 form a frame in which the rest of the unit is mounted for swinging movement thereby, the cap plate 7 being fixed on said members against rotation and the armature shaft 13, and parts carried thereby, rotatably mounted in the said cap plate and spider member 24. This provides a simple construction, compact mounting and a relation of parts such that the unit may readily be assembled and disassembled. The air entering the ducts 47, under pressure, is exhausted against the front of the armature 12 to be blown back toward the front by the fan 46 as will be clear.

The invention will, it is believed, be clearly understood from the foregoing without further explanation.

Manifestly my invention, as described, is susceptible of modification both as regards relation of parts and structural details and right is herein reserved to all such modifications falling within the scope of the subjoined claims.

What I claim is:—

1. In a structure of the class described, a wheel having a hub like housing extending axially therefrom and closed at the front end thereof, a cylindrical shell fitted into and fixed to said housing and extending rearwardly therefrom, a cap plate fitting over and closing the rear end of the shell, a cage-like frame extending through said plate into said shell and having the plate fixed thereto, a motor stator fixed to said frame in said shell, and an armature shaft fixed at an end to said shell and housing and having its other end journaled in said plate.

2. In a structure of the class described, a wheel having a hub like housing extending axially therefrom and closed at the front end thereof, a cylindrical shell fitted into and fixed to said housing and extending rearwardly therefrom, a cap plate fitting over and closing the rear end of the shell, a cage-like frame extending through said plate into said shell and having the plate fixed thereto, a motor stator fixed to said frame in said shell, an armature shaft fixed at an end to said shell and housing and having its other end journaled in said plate, and a pair of brake shoes suspended from said plate in said shell and operative to engage the rear end of the latter.

3. In a structure of the class described, a wheel having a hub like housing extending axially therefrom and closed at the front end thereof, a cylindrical shell fitted into and fixed to said housing, a cap plate fitting over and closing the rear end of the shell, a cage-like frame extending through said plate into said shell and having the plate fixed thereto, a motor stator fixed in said frame, an armature shaft fixed at one end to said shell and housing and having its opposite end journaled in said plate, a blower fan on the armature shaft intermediate the motor and plate, said frame having air ducts therein opening at the opposite ends thereof onto the front of the motor and the rear part of said frame, and pipe lines connected to said ducts at the rear of the frame for introducing air under pressure into said ducts.

WAYNE A. HOCKETT.